Oct. 31, 1944.  F. F. WOLF  2,361,728
CAN HANDLING MACHINE
Filed Oct. 14, 1940  5 Sheets-Sheet 1
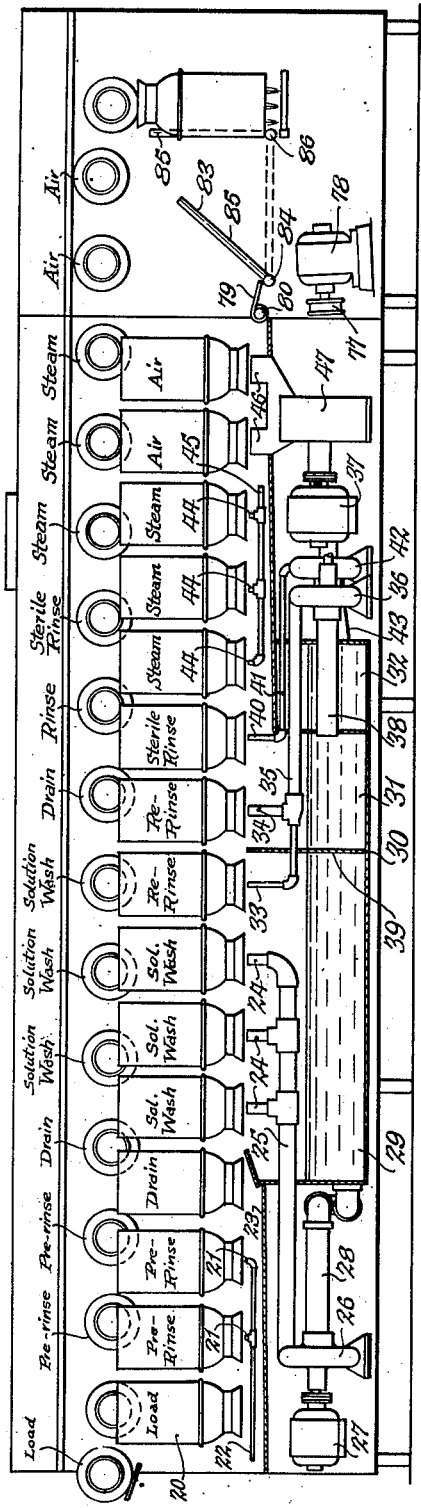
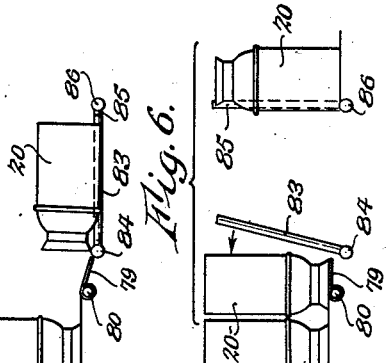
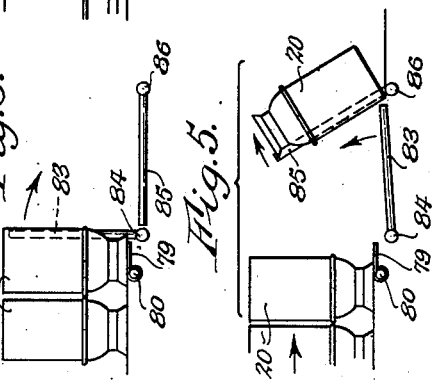
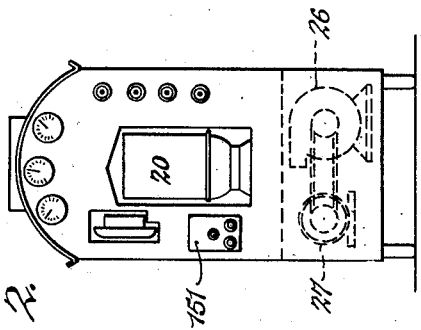
INVENTOR
Frank F. Wolf
BY
John S. Powers
ATTORNEY Oct. 31, 1944.  F. F. WOLF  2,361,728
CAN HANDLING MACHINE
Filed Oct. 14, 1940   5 Sheets-Sheet 2
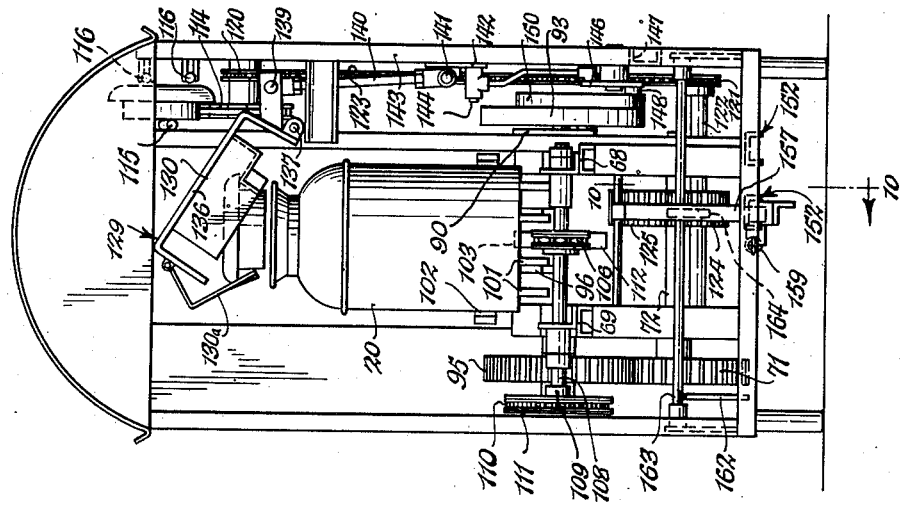
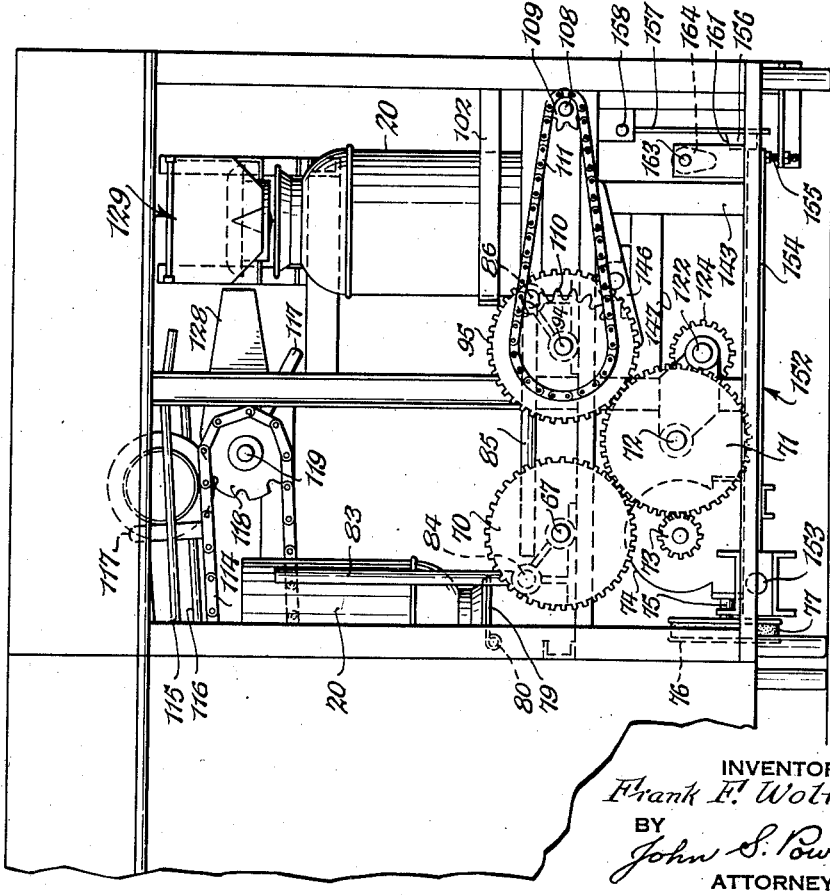
INVENTOR
Frank F. Wolf
BY
John S. Powers
ATTORNEY Oct. 31, 1944.　　　　F. F. WOLF　　　　2,361,728
CAN HANDLING MACHINE
Filed Oct. 14, 1940　　　5 Sheets-Sheet 3
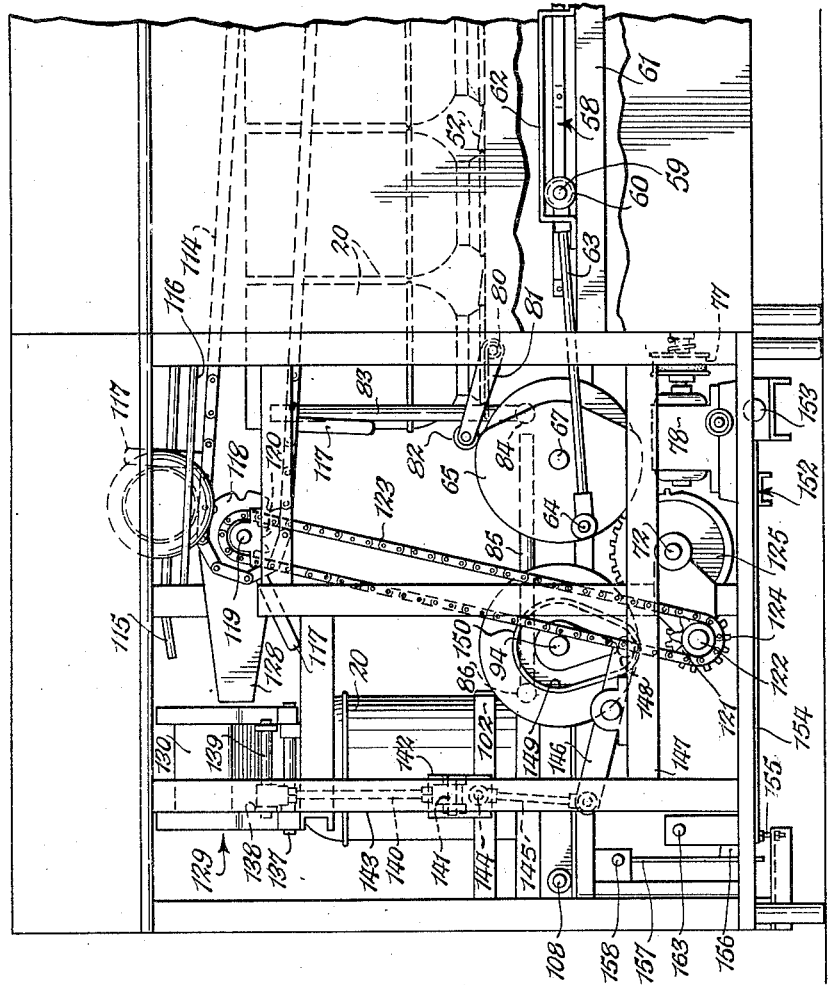
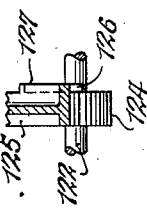
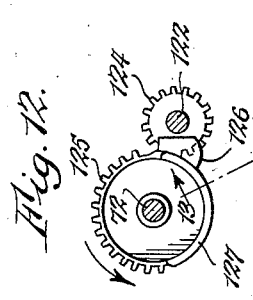
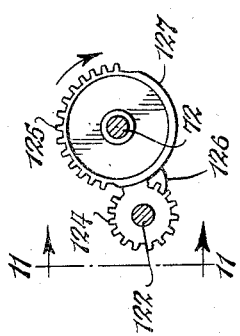
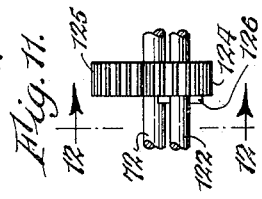
INVENTOR
Frank F. Wolf
BY
John S. Powers
ATTORNEY Oct. 31, 1944.  F. F. WOLF  2,361,728
CAN HANDLING MACHINE
Filed Oct. 14, 1940  5 Sheets-Sheet 4
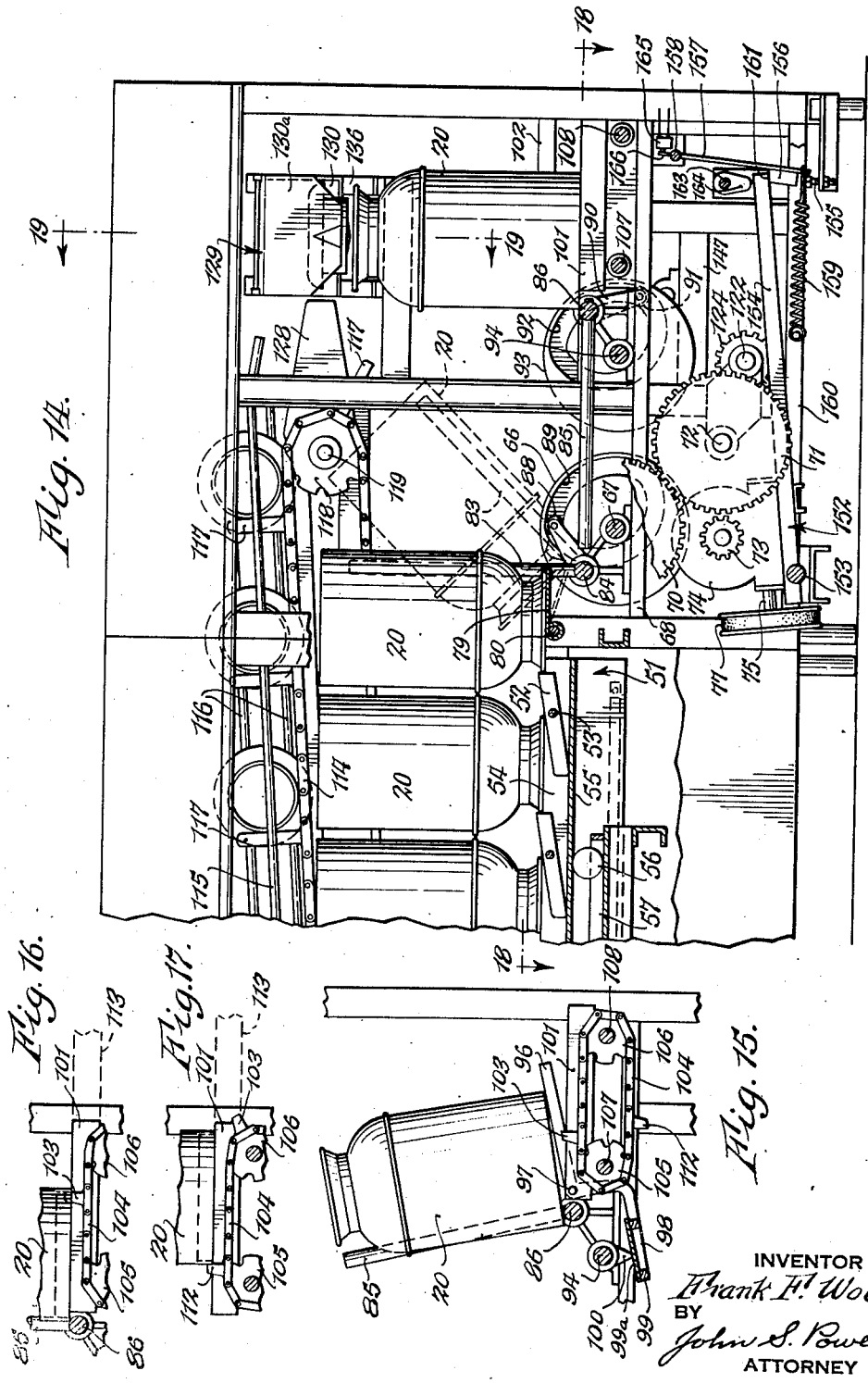

Oct. 31, 1944.  F. F. WOLF  2,361,728
CAN HANDLING MACHINE
Filed Oct. 14, 1940   5 Sheets-Sheet 5
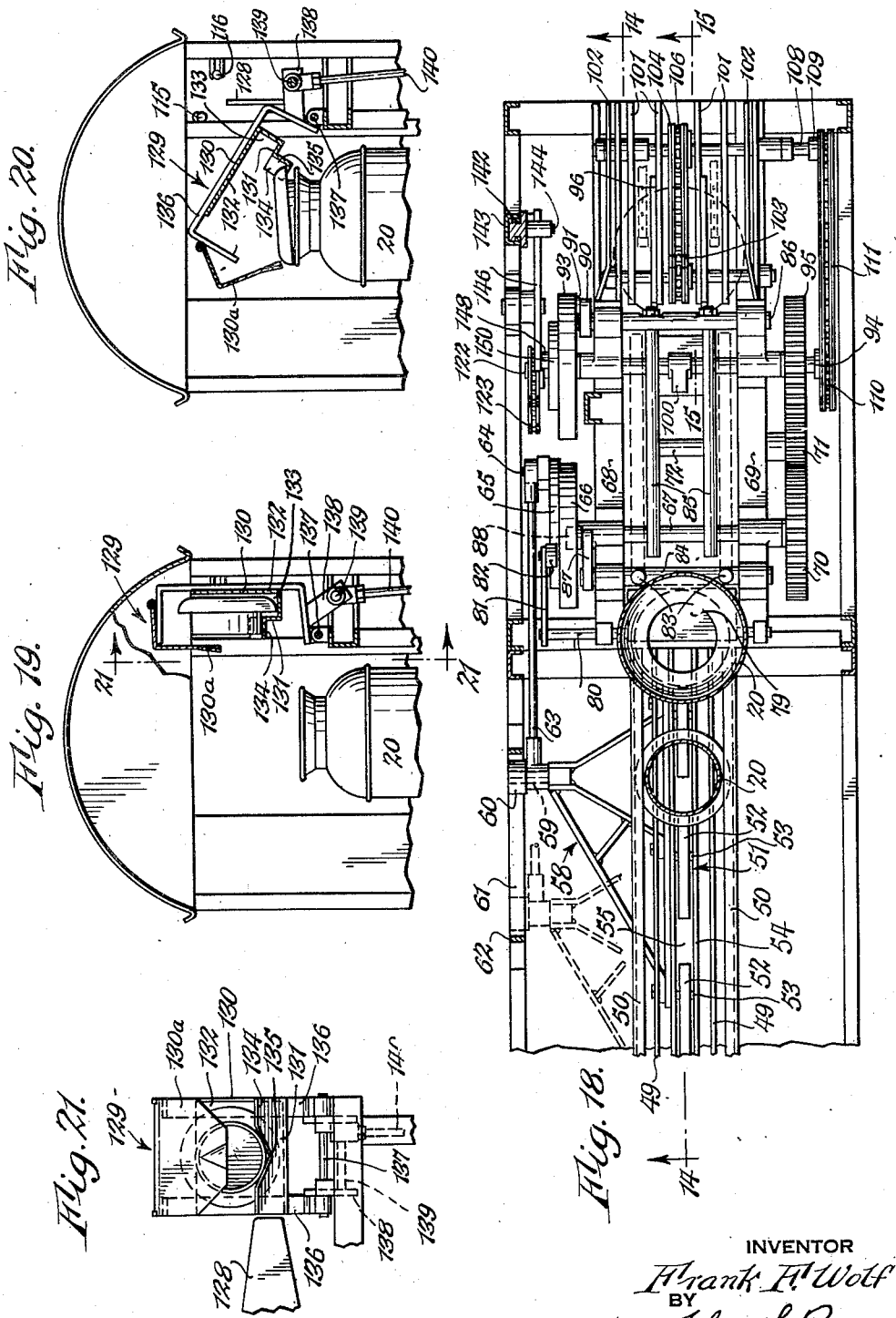
INVENTOR
Frank F. Wolf
BY
John S. Powers
ATTORNEY Patented Oct. 31, 1944

2,361,728

UNITED STATES PATENT OFFICE 2,361,728

CAN HANDLING MACHINE

Frank F. Wolf, Cattaraugus, N. Y., assignor to Oakes & Burger Co. Inc., Cattaraugus, N. Y., a corporation of New York Application October 14, 1940, Serial No. 361,072

7 Claims. (Cl. 214—1)

This invention relates to improvements in machines for washing containers such as milk cans and the like and more particularly, although not necessarily, the invention is concerned with a machine of the type wherein the containers, which are inverted, are subjected to the various cleansing, rinsing, sterilizing and drying mediums as they are advanved in step-by-step movements along a runway, the containers being righted to receive their covers as they move off the runway and approach the discharge end of the machine.

One object of the invention is to provide a novel design and arrangement of the parts of the machine, whereby to obtain simplicity in construction, enable high speed, quiet and economical operation and insure thorough and highly effective washing, sterilizing and drying of the containers.

A further object is a machine wherein, despite the greater length of the cover trackway as compared to the container runway, provision is made for advancing the covers to the position in which they are applied to the containers positively and without the aid of gravity, this object contemplating the spacing of the stations along the cover trackway further apart than the stations along the container runway and the advancement of the covers in step-by-step movements which, although simultaneous with and of the same duration as, are of a greater magnitude than the step-by-step movements of the containers.

A still further object is to provide a can righting mechanism which is quiet and gentle in operation and which is so designed as to avoid the transfer of any of the cleansing and sterilizing mediums, contaminated, or otherwise, to the containers as an incident to the up-ending operations.

A still further object is a machine wherein, as a safety measure and in order to avoid damage to, or jamming of, the parts, provision is made for automatically disengaging the driving mechanism and shutting down the machine in the event that its operation is opposed by any force substantially greater than that encountered under normal conditions.

The invention is illustrated in the accompanying drawings in which:

Figure 1 is a diagrammatic view of a milk can washing machine embodying the features of the invention.

Figure 2 is a view in elevation of the receiving end of the machine.

Figures 3, 4, 5 and 6 are diagrammatic views illustrating the operation of the can righting mechanism.

Figure 7 is a side elevational view of the discharge end of the machine.

Figure 8 is a front elevation of the same end of the machine.

Figure 9 is a view generally similar to Figure 7 but of the opposite side of the machine.

Figure 10 is a detail section taken along line 10—10 of Figure 8.

Figure 11 is a section taken along line 11—11 of Figure 10.

Figure 12 is a section taken along line 12—12 of Figure 11.

Figure 13 is a fragmentary section taken along line 13—13 of Figure 12.

Figure 14 is a vertical section through the discharge end of the machine and is taken along line 14—14 of Figure 18.

Figure 15 is a vertical section through the can righting mechanism and is taken along line 15—15 of Figure 18.

Figures 16 and 17 are fragmentary sections along the same line as Figure 15 and show different positions of the advancing mechanism for the righted cans.

Figure 18 is a horizontal section through the discharge end of the machine and is taken along line 18—18 of Figure 14.

Figure 19 is a vertical section taken along line 19—19 of Figure 14 and shows the cover applying member in a receiving position.

Figure 20 is a similar section along the same line and shows the cover applying member in the position in which it deposits the cover upon its can.

Figure 21 is a vertical section taken along line 21—21 of Figure 19.

The machine, as illustrated, includes a load station for the cans which are indicated at 20, two pre-rinse stations, a drain station, three solution wash stations, two re-rinse stations, a sterilizing rinse station, three steam sterilizing stations and two air drying stations (the various stations referred to being identified in Figure 1 by the legends upon the containers). The cans, which are inverted, move in single file, passing step-by-step from one to another of the stations in the order named. As they leave the last drying station they are righted and their bottoms are washed. The rinse water is introduced into the cans at the two pre-rinse stations through nozzles 21, the latter having a common supply pipe 22. The liquid which drains from these cans and the cans at the load and drain stations accumulates in a pan 23 and may be disposed of in any suitable manner. The washing solution is introduced into the cans at the three solution wash stations through nozzles 24, the latter having a common supply pipe 25 which is connected to the exhaust side of a pump 26. The said pump is driven by electric motor 27 and is connected by an intake pipe 28 to a compartment 29 in which a body of washing solution is maintained at a predetermined level. The compartment 29 is located at one end of a tank 30 which also includes two other compartments 31 and 32. The washing solution which is discharged into the cans drains back into the compartment 29. The water for rinsing the cans after they have been subjected to the action of the washing solution is introduced into the cans at the re-rinse stations through nozzles 33 and 34 which have a common supply pipe 35. The latter is connected to the exhaust side of a pump 36 which is driven by an electric motor 37, the intake side of the said pump being connected by a pipe 38 to the compartment 31 in which a body of rinsing water is maintained at a predetermined level. In this connection it will be noted that the partition 39 which separates the compartments 29 and 31 is located between the nozzles 33 and 34. Hence a can at the first re-rinse station drains into the solution wash compartment while at the second station it drains into the rinsing water compartment. This is desirable as the draining of washing solution into the rinsing tank is reduced to a minimum. At the sterilizing rinse station hot water is introduced into the cans through a nozzle 40. The latter is connected by a pipe 41 to the exhaust side of a pump 42 which is driven by the motor 37. The intake side of the pump 42 is connected by a pipe 43 to the compartment 32 in which a body of hot water is maintained at the desired level. Steam is introduced into the cans at the steam sterilizing stations through nozzles 44 which have a common supply line 45. The steam introduced into the cans at the first station is preferably wet steam while that introduced into the cans at the last two stations is preferably live steam. Any liquid draining from the cans at the second re-rinse station, the sterilizing rinse station and the three steam sterilizing stations accumulates in the compartment 31. At the drying stations air is introduced into the cans through nozzles 46, the latter being connected to the exhaust of an air pump 47 which is driven by the motor 37. It is understood, of course, that during their passage through the machine in the manner described the exteriors of the cans may be likewise subjected to any, or all, of the above noted cleansing, sterilizing and drying mediums.

The covers 48 are placed in the machine at the same time as the cans and the machine, therefore, includes a load station for the covers, two pre-rinse stations, a drain station, three solution wash stations, a second drain station, two re-rinse stations, the latter of which is preferably a sterilizing rinse, three steam sterilizing stations and two air drying stations (the various stations noted being identified by the legends above the covers). The particular manner in which the covers are subjected to the various treating mediums is unimportant and hence is not illustrated. The covers are moved edgewise from station to station in the order named in step-by-step movements and upon leaving the last drying station they are applied to the cans while the bottoms of the latter are being washed, it being understood in this connection that the various treatments described in connection with the washing, sterilizing and drying of the cans and their covers are intended by way of example only and may, therefore, be varied if desired.

In their passage through the machine the inverted cans are pushed along a pair of horizontal supporting rails 49 (Figure 18) between a pair of guide rails 50, the latter being located above the supporting rails and cooperating with the necks of the cans. The cans are moved individually along the runway provided by the supporting rails and guide rails by a reciprocating carriage 51 (Figure 14). Dogs 52 are pivotally mounted upon pins 53 which are supported between side walls 54 of the carriage, the dogs being unbalanced so that their forward ends are normally elevated above the supporting rails while their rear ends rest upon a horizontal wall 55. Rollers 56 which are located in a horizontal trackway 57 support the carriage while permitting it to move lengthwise. It will be apparent that during movement of the carriage in a forward direction, the dogs 52 will engage the lips of the cans and move the latter forward a distance corresponding to the forward movement of the carriage. During retractory movements of the carriage the lip engaging portions of the dogs will be depressed and will ride under the lips of the succeeding cans so that during the next forward movement of the carriage the cans will be again advanced.

In order to advance the cans step-by-step along the runway so that each pauses for a predetermined interval at each of the various stations, a laterally extending bracket 58 (Figure 18) is fixed to one of the side walls 54 of the carriage 51. The said bracket is triangular in shape and comprises a plurality of arms which converge toward and which carry a stub shaft 59. A roller 60 which is mounted upon the outer end of the shaft 59 is adapted to move in a guideway provided by a horizontal frame member 61 and a guide 62 (Figure 9). The shaft 59 is connected by a rod 63 to a crank pin 64 which is carried by a cam disc 65. The latter and a cam disc 66 (Figure 18) are fixed to one end of a shaft 67 which is journaled in bearings carried by horizontal frame members 68 and 69. The other end of the shaft 67 carries a gear 70 which meshes with a gear 71 (Figure 7). The latter gear is fixed to a transverse shaft 72 which is mounted in stationary bearings and meshes with a gear 73 of a gear reduction unit 74, the driven shaft 75 thereof carrying a pulley 76 which is connected by a belt 77 to the driving pulley of an electric motor 78 (Figure 9).

Mechanism is provided for receiving and righting the cans as they leave the runway. The said mechanism includes a plate 79 (Figure 18) which is mounted upon a shaft 80. An extension of one end of the said shaft carries a crank 81 which in turn carries a roller 82, the latter riding upon the cam 65. The righting mechanism also includes a pair of arms 83 which are carried in spoke-like fashion by a hub-shaft 84 and a pair of similar cooperating arms 85 which are carried by a hub-shaft 86, the bearings for the said shafts being mounted upon the frame members 68 and 69. A crank 87 which is fixed to one end of the shaft 84 carries a roller 88 which extends into a cam groove 89 formed in the face of the disc 66 while a crank 90 which is fixed to one end of the shaft 86 carries a roller 91 which extends into a cam groove 92 formed in the face of a disc 93. The latter is fixed to one end of a shaft 94 which is journaled in bearings carried by the frame members 68 and 69, a gear 95 which is fixed to the other end of the said shaft meshing with the gear 71.

As a can approaches the end of the runway it moves upon the plate 79 which has moved to a horizontal position to receive it. Referring to Figure 3, it will be noted that at this time the arms 83 occupy a vertical position while the arms 85 occupy, or are moving toward, a horizontal position. The location of the arms 83 with respect to the plate 79 is such that as a can moves upon the latter it is positioned against, or in close proximity, to them. The parts are so timed that as, or shortly after, this occurs the shaft 80 moves clockwise to permit the outer end of the plate to lower and at the same time the shaft 84 is rotated in a clockwise direction while the shaft 86, and hence the arms 85, remains stationary. The can, therefore, tips forward and is lowered to a horizontal position upon the arms 85, as best shown in Figure 4, it being noted that the spacing between the arms 83 is greater than that between the arms 85 and that as the can is lowered upon the arms 85 in the manner described, the arms 83 assume positions at opposite sides of, but in substantially the same plane as, the arms 85. After the can has been lowered upon the latter the shaft 86 is rotated in a clockwise direction to tip the can toward an upright position, as best shown in Figure 5. During the initial part of this movement of the arms 85, the shaft 84, and hence the arms 83, remains stationary. As the arms 85 move the can out of the path of the arms 83, however, the shaft 84 turns in a counter-clockwise direction toward its original position, as best shown in Figures 5 and 6, the shaft 80 in the meantime returning the plate 79 to its original position to receive a succeeding can.

As a can approaches a position in which it would ordinarily complete its righting movement under the influence of gravity, its bottom is lowered upon a pair of upwardly inclined arms 96 (Figures 15 and 18) which are pivotally mounted upon a cross-shaft 97 and have downwardly and rearwardly extending tail-pieces 98 connected by bars 99 and a plate 99a. The said plate is positioned below a cam 100 which is centrally located upon the shaft 94 and the parts are so timed that the plate 99a is depressed to move the arms 96 upwardly as the can approaches the position shown in Figure 15. Substantially simultaneusly with the resting of the can upon the arms 96 the shaft 94 moves the cam 100 to release the plate 99a to permit the arms 96 to lower the can upon a horizontal track comprising supporting rails 101 and guide plates 102 (Figure 18). After a can moves out of the arms 85 and is deposited upon the rails 101 in the manner described, the shaft 86 moves counter-clockwise to move the said arms toward their original horizontal positions as the shaft 84 moves the arms 83 to receive the succeeding can which in the meantime is being moved upon the plate 79.

When a can comes to rest in an upright position upon the rails 101, it is supported over a tooth 103 (Figures 15, 16 and 17) which is carried by a chain 104 and which is located substantially midway between the leading and trailing portions of the bottom flange of the can. The chain 104 is carried by sprockets 105 and 106, the former being mounted upon a shaft 107 and the latter upon a shaft 108 which also carries a sprocket 109 (Figure 18), the sprocket 109 and a companion sprocket 110, which is mounted upon the shaft 94, being connected by a chain 111. When a can is deposited upon the rails 101 the tooth 103 is advanced to engage the inside of the bottom flange, as best shown in Figure 16, and the can is advanced along the rails 101 until the tooth 103 moves out of engagement with the said flange. As this occurs, a second tooth 112 (Figure 17) which is also carried by the chain 104 engages the bottom flange at the rear of the can and pushes the latter upon a platform which is sufficiently indicated at 113 (Figures 16 and 17).

It will be apparent that during the righting movement each can is under control at all stages and at no time is permitted free or unrestrained movement in response to forces of gravity. Quiet operation of the machine is thus promoted while at the same time denting or marring of the cans is avoided. The righting mechanism described has the further advantage that only small areas of the cans are contacted and there are no pockets in which liquids draining from the cans may accumulate. The transfer of such liquids to the cans as they are upended is, therefore, reduced to a minimum.

The cover of a can is applied as the latter is at rest upon the rails 101, the covers, as noted heretofore, being placed in the machine at the same time as the cans. The track-way for the covers comprises the upper run of a conveyor chain 114 and guide rods 115 and 116. The necks of the covers rest upon the chain 114; the guide rod 115 cooperates with the ends of the necks; and the guide rods 116 cooperate with the heads. The track-way is upwardly inclined in the direction of the discharge end of the machine and the covers are moved along it by fingers 117 which are fixed to the chain at regularly spaced intervals. The chain 114 is carried by a sprocket 118 (Figure 9) at the discharge end of the machine and a similar sprocket at the receiving end. The sprocket 118 is mounted upon a shaft 119 which also carries a sprocket 120, the latter and a sprocket 121, which is fixed to a shaft 122, being connected by a chain 123. A gear 124 (Figure 12) which is also fixed to the shaft 122 cooperates with a segment driving gear 125 which is fixed to the shaft 72, the driving gear effecting a complete revolution of the gear 124 as it rotates a half revolution and permitting the said gear to remain at rest as it completes the other half of such revolution. In order to insure proper cooperation between the driving gear 125 and the driven gear 124, the latter is preferably formed, or provided, upon one face with a shoe 126 which engages an arcuate rib 127 formed, or provided, upon one face of the gear 125, the shoe and rib locking the two gears against relative angular movement while their teeth are out of engagement. It will thus be apparent that rotation of the gear 125 will effect intermittent rotary movements of the gear 124. The conveyor chain 114 will, therefore, be driven to move the covers step-by-step along the track-way with an interval of rest at each of the stations through which they pass. As they approach the discharge end of the track-way the covers are rolled off the upper run of the chain 114 and onto a track-piece 128. The leading cover is pushed along the latter by one of the fingers 117 and as the latter moves around the sprocket 118 it pushes the cover into a cover applying member 129 which at this time occupies the position shown in Figure 19.

The cover applying member includes a holder 130, the inner side wall 131 thereof cooperating with the back wall 132 to provide a channel 133 for the head of the cover and having an inwardly directed flange 134 which provides a seat for the neck of the cover. The flange 134 is preferably formed with a shallow depression 135 (Figure 21) which the neck of the cover enters when the latter reaches the proper position in the holder. The holder is carried by a pair of spaced arms 136 having upper angular extensions to which a gate 130a is pivotally connected and lower angular extensions which are pivotally mounted upon a shaft 137. Tail-pieces 138 which are suitably secured to the lower angular extensions carry a cross-rod 139 which is connected by a rod 140 to a pin 141 (Figure 9) which is carried by a slide 142. The latter is mounted for vertical movement in a guide-way provided by a vertical frame member 143 and carries a second pin 144 which extends at right angles with respect to the pin 141. A rod 145 connects the pin 144 to one end of a lever 146 which is pivotally mounted upon a horizontal frame member 147, the other end of the lever carrying a roller 148 which extends into a cam groove 149 formed in a disc 150 which is carried by the shaft 94.

When a can has been righted in the manner described and while it is at rest upon the rails 101 (during movement of the tooth 103 to the position in which it engages the bottom flange of the can), the cover applying member 129 is pivoted over the mouth of the can to the position shown in Figure 20. During such movement of the cover applying member, the gate 130a swings outwardly and the cover is deposited upon the can. It will be noted that the movement of the covers from the receiving end of the machine to the position in which they are applied to the cans is effected positively and without the aid of gravitational forces despite the fact that the trackway for the covers is longer than the runway for the cans and despite the fact that the step-by-step movements of the covers are simultaneous with and of the same duration as the step-by-step movements of the cans. As illustrated and preferred, this is achieved by so designing the cover advancing mechanism that the movements of the covers are of greater magnitude than the movements of the cans. As a result the covers gradually move ahead of the cans and enter the member 129 in ample time to be applied to the proper cans when the latter have been righted. In this connection it is understood, of course, that owing to the greater distance traveled by the covers in their step-by-step movements, the distance between the stations along the track-way is correspondingly increased.

The motor 27 which drives the pump 26, the motor 37 which drives the pumps 36 and 42 and fan 47 and the motor 78 which drives the can and cover advancing mechanisms, can righting mechanism and the cover applying mechanism are controlled from a box 151 (Figure 2) at the receiving end of the machine. Preferably the said motors are interconnected in any conventional manner so that the machine cannot be started unless they are all connected to power and so that the machine will be automatically shut down in the event any one of them is rendered inoperative, whereby to prevent the passage of cans and covers through the machine when they will not be subjected to the action of the desired washing, rinsing, sterilizing and drying mediums.

As a safety measure and in order to prevent injury to the machine, means is provided whereby the can and cover advancing mechanisms, can righting mechanism and cover applying mechanism will be automatically disconnected from power in the event that the operation of any of them is opposed by a force substantially greater than that encountered under normal operating conditions. To this end the motor 78 and gear reduction unit 74 are mounted upon a frame 152 (Figures 7, 9 and 14) which is pivotally mounted at its inner end upon a cross-shaft 153. Under normal operating conditions the gear 73 meshes with the gear 71 and the outer end of a longitudinal member 154 of the frame 152 rests upon an adjustable stop 155. In this position of the frame 152 the free end of the member 154 abuts a block 156 which is carried by a depending arm 157. The latter is pivotally mounted at its upper end upon a shaft 158 and has the lower end connected by spring 159 to a horizontal member 160, the said spring normally holding the block 156 against the end of the member 154, as shown in Figure 7. Should any of the parts of the actuating mechanisms jam, the gear 71 will offer an increased resistance to rotation and the frame 152 will pivot upon the cross-shaft 153 to permit the gear 73 to work upwardly. As the member 154 moves above the upper edge of the block 156, the latter under the influence of the spring 159 is pulled inwardly and a cam surface 161 on the upper face of the block lifts the outer end of the frame 152 to effect and maintain complete separation of the gears 73 and 71 to prevent them from clashing. During this final movement of the frame 152 the block 156 is moved under the outer end of the member 154 and the frame is moved to the position shown in Figure 14, thereby disconnecting the various mechanisms driven by the motor 78.

Means is provided for reengaging the gears 73 and 71. The said means includes a crank 162 (Figure 8) which is fixed to a shaft 163 at one side of the machine so as to be within convenient reach of an attendant. A cam 164 which is also fixed to the said shaft behind the arm 157 normally occupies the position shown in Figure 14. To reengage the gears, therefore, it is only necessary to turn the crank to cause the cam 164 to move the arm 157 outwardly against the action of the spring 159 to a position in which the block 156 will release the member 154 and permit the frame to return to its normal position by gravity, the gear 73 moving into engagement with the gear 71 as this occurs.

Preferably the circuit for the various motors includes a normally closed switch 165 (Figure 14) which is so located with respect to a finger 166 which is carried by the shaft 158 that it is opened when the arm 157 is moved inwardly in the manner described. The motor circuit, therefore, will be broken simultaneously with the disengagement of the gears 73 and 71 of the driving mechanism. The switch 165 will, of course, close automatically to reestablish the motor circuit when it is released by the finger 166 as the crank 162 is operated to restore the frame 152 to its normal position and thereby reengage the gears of the driving mechanism.

I claim as my invention:

1. In a machine of the character described through which containers travel along a runway in an inverted position, the combination of a support at the end of said runway upon which the inverted containers are advanced and mechanism for righting the containers comprising two pairs of spaced arms, one pair of said arms being movable to a substantially vertical position to receive the containers from said support and thereafter being movable to a substantially horizontal position, means for simultaneously tilting said support and moving said first mentioned pair of arms toward a horizontal position, the other pair of said arms being movable to a substantially horizontal position to receive the containers as said first mentioned pair of arms reach the lower limit of their range of movement, being stationary while receiving said containers and being thereafter movable to a substantially vertical position and means for actuating said pairs of arms in timed relation, whereby each container is righted gently and quietly and in a substantially continuous operation, said support and said first mentioned pair of arms being independently operable.

2. In a machine of the character described through which containers travel along a runway in an inverted position, the combination of a pivotally mounted support at the end of said runway upon which the inverted containers are advanced and mechanism for righting the containers comprising two rock shafts mounted in tandem in a substantially horizontal plane, cooperating pairs of spaced arms carried by said rock shafts, one pair of said arms being movable to a substantially vertical position to receive the containers from said support and thereafter being movable to a substantially horizontal position, means for simultaneously tilting said support and moving said pair of arms toward a horizontal position, the other pair of said arms being movable to a substantially horizontal position to receive the containers as said first mentioned pair of arms reach the lower limit of their range of movement, being stationary while receiving the containers and being thereafter movable to a substantially vertical position and means for actuating said rock shafts in timed relation, whereby each container is righted gently and quietly and in a substantially continuous operation, said support and said first mentioned pair of arms being independently operable.

3. In a machine of the character described through which containers travel along a runway in an inverted position, the combination of a support at the end of said runway upon which the inverted containers are advanced, mechanism for righting the containers and a support upon which the righted containers are deposited, said mechanism comprising two pairs of spaced arms, one pair of said arms being movable to a substantially vertical position to receive the containers from said first mentioned support and thereafter being movable to a substantially horizontal position, means for simultaneously tilting said first mentioned support and moving said pair of arms toward a horizontal position, the other pair of said arms being movable to a substantially horizontal position to receive the containers as said first mentioned arms reach the lower limit of their range of movement, being stationary while receiving the containers and being thereafter movable toward a vertical position, means for actuating said arms in timed relation and means for engaging the bottoms of the containers as they approach an upright position and for lowering them gently upon said last mentioned support, as said second mentioned pair of arms complete their movement toward said vertical position.

4. In a machine of the character described through which containers travel along a runway in an inverted position, the combination of a pivotally mounted support at the end of said runway upon which the inverted containers are advanced, mechanism for righting the containers and a support upon which the righted containers are deposited, said mechanism comprising two rock shafts mounted in tandem in a substantially horizontal plane, a pair of spaced arms carried by one of said rock shafts, said arms being movable to a substantially vertical position to receive the containers from said first mentioned support and thereafter being movable to a substantially horizontal position, means for simultaneously tilting said first mentioned support and moving said pair of arms toward a horizontal position, a second pair of arms carried by the other of said rock shafts, said last mentioned pair of arms being movable to a substantially horizontal position to receive the containers as said first mentioned pair of arms reach the lower limit of their range of movement, being stationary while receiving the containers and being thereafter movable toward a vertical position, means for actuating said rock shafts in timed relation and means for engaging the bottoms of the containers as they approach an upright position and for lowering them gently upon said last mentioned support, as said second mentioned pair of arms complete their movement toward said vertical position.

5. In a machine of the character described through which containers travel along a runway in an inverted position, the combination of a pivotally mounted support at the end of said runway upon which the inverted containers are advanced, mechanism for righting the containers and a support upon which the righted containers are deposited, said mechanism comprising two rock shafts mounted in tandem in a substantially horizontal plane, a pair of spaced arms carried by one of said rock shafts, said arms being movable to a substantially vertical position to receive the containers from said first mentioned support and thereafter being movable to a substantially horizontal position, means for tilting said first mentioned support as said pair of arms moves toward a horizontal position, a second pair of arms carried by the other of said rock shafts, said last mentioned arms being movable to a substantially horizontal position to receive the containers as said first mentioned pair of arms reach the lower limit of their range of movement, being stationary while receiving the containers and being thereafter movable toward a vertical position, said pairs of arms assuming a substantially coplanar relation with respect to one another and with respect to said shafts with one pair located interjacent the other during transfer of the containers from one pair to the other, means for actuating said rock shafts in timed relation and means for engaging the bottoms of the containers as they approach an upright position and for lowering them gently upon said last mentioned support, as said second mentioned pair of arms complete their movement toward said vertical position.

6. In a machine of the character described through which containers travel along a runway in an inverted position, the combination of mechanism for righting the containers and a support upon which the righted containers are deposited, said righting mechanism comprising two rock shafts mounted in tandem in a substantially horizontal plane, a pair of arms carried by each of said rock shafts, one pair of arms being movable to a substantially vertical position to receive the containers from said runway and thereafter being movable to a substantially horizontal position, the other pair of arms being movable to a substantially horizontal position to receive the containers as said first mentioned arms reach the lower limit of their range of movement and being thereafter movable toward a vertical position, a pair of drive shafts mounted in parallel relation with respect to one another and with respect to said rock shafts, and means for driving both of said drive shafts continuously and in the same direction, one of said drive shafts carrying a cam for actuating one of said rock shafts and the other of said drive shafts carrying a cam for actuating the other of said rock shafts, whereby to cause said pairs of arms to cooperate in the manner described.

7. In a machine of the character described through which containers travel along a runway in an inverted position, the combination of mechanism for righting the containers and a support upon which the righted containers are deposited, said righting mechanism comprising two rock shafts mounted in tandem in a substantially horizontal plane, a pair of arms carried by each of said rock shafts, one pair of arms being movable to a substantially vertical position to receive the containers from said runway and thereafter being movable to a substantially horizontal position, the other pair of arms being movable to a substantially horizontal position to receive the containers as said first mentioned arms reach the lower limit of their range of movement and being thereafter movable toward a vertical position, a pair of drive shafts mounted in parallel relation with respect to one another and with respect to said rock shafts, means for driving both of said drive shafts continuously and in the same direction, one of said drive shafts carrying a cam for actuating one of said rock shafts and the other of said drive shafts carrying a cam for actuating the other of said rock shafts, whereby to cause said pairs of arms to cooperate in the manner described, means extending above said support for engaging the bottoms of the containers as they approach an upright position, and a second cam on one of said drive shafts for lowering said engaging means and thereby lower said containers gently upon said support as said second pair of arms complete their movement toward a vertical position.

FRANK F. WOLF.